United States Patent
Powers et al.

(10) Patent No.: US 9,932,233 B2
(45) Date of Patent: Apr. 3, 2018

(54) PROCESS FOR MAKING PRECISION NANOPARTICLES BY HYDROTHERMAL FLOW MANUFACTURING

(71) Applicant: UNIVERSITY OF FLORIDA RESEARCH FOUNDATION, INC., Gainesville, FL (US)

(72) Inventors: Kevin William Powers, Gainesville, FL (US); Jiaqing Zhou, Waycross, GA (US); Parvesh Sharma, Gainesville, FL (US); Spyros A. Svoronos, Gainesville, FL (US); Brij M. Moudgil, Gainesville, FL (US); Gary Wayne Scheiffele, Gainesville, FL (US); Ajoy K. Saha, Kolkata (IN); Paul Louis Carpinone, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 319 days.

(21) Appl. No.: 14/766,157

(22) PCT Filed: Feb. 6, 2014

(86) PCT No.: PCT/US2014/015106
§ 371 (c)(1),
(2) Date: Aug. 6, 2015

(87) PCT Pub. No.: WO2014/124137
PCT Pub. Date: Aug. 14, 2014

(65) Prior Publication Data
US 2016/0039673 A1    Feb. 11, 2016

Related U.S. Application Data

(60) Provisional application No. 61/761,315, filed on Feb. 6, 2013.

(51) Int. Cl.
*C01B 19/00* (2006.01)
*C22B 3/00* (2006.01)
(Continued)

(52) U.S. Cl.
CPC .............. *C01B 19/007* (2013.01); *B01J 4/008* (2013.01); *B01J 19/004* (2013.01);
(Continued)

(58) Field of Classification Search
CPC ............ B01J 19/004; B01J 2219/00186; B01J 2219/00162; B01J 2219/00054;
(Continued)

(56) References Cited

U.S. PATENT DOCUMENTS 6,179,912 B1    1/2001  Barbera-Guillem et al.
7,393,516 B2 *  7/2008  Seo .................. B82Y 30/00
                                                 423/508
(Continued)

FOREIGN PATENT DOCUMENTS

CN          101525534       9/2009
WO      WO 2009-132198     10/2009

OTHER PUBLICATIONS

Asokan, S. et al., "The use of heat transfer fluids in the synthesis of high-quality CdSe quantum dots, core/shell quantum dots, and quantum rods," *Nanotechnology*, 2005, pp. 2000-2011, vol. 16.
(Continued)

*Primary Examiner* — Timothy C Vanoy
(74) *Attorney, Agent, or Firm* — Saliwanchik, Lloyd & Eisenschenk (57) ABSTRACT

A continuous reaction system (CRS) allows a method to prepare quantum dots (QDs) in a continuous manner with high precision. The CRS pumps a plurality of reagent fluids into one or more mixing sites to form a reaction fluid that is carried through a heating chamber at elevated pressures to
(Continued)

carry out hydrothermal growth of the QDs. The pumps and heating chamber are controlled with a high precision by employing a detector downstream of the heating chamber to provide a signal that is dependent on the composition and size of the QDs. The signal is provided to a signal processor that provides a signal that control the flow rates and temperature parameters in the system. The QDs produced in this manner are consistent in size and composition and can be of a single semiconductor composition or can be core-shell QDs with a shell semiconductor formed on a core semiconductor.

14 Claims, 11 Drawing Sheets

(51) Int. Cl.
    *H01B 1/02* (2006.01)
    *B22F 9/24* (2006.01)
    *B01J 19/00* (2006.01)
    *C01B 33/12* (2006.01)
    *B01J 4/00* (2006.01)
    *B82Y 20/00* (2011.01)

(52) U.S. Cl.
    CPC ............. *B01J 19/0033* (2013.01); *B22F 9/24* (2013.01); *C01B 33/12* (2013.01); *C22B 11/04* (2013.01); *H01B 1/02* (2013.01); *B01J 2219/00054* (2013.01); *B01J 2219/00162* (2013.01); *B01J 2219/00186* (2013.01); *B82Y 20/00* (2013.01); *C01P 2002/72* (2013.01); *C01P 2002/84* (2013.01); *C01P 2004/04* (2013.01); *C01P 2004/64* (2013.01); *C01P 2004/80* (2013.01); *Y10S 977/774* (2013.01)

(58) Field of Classification Search
    CPC .......... B01J 19/0033; B01J 4/008; B22F 9/24; C01B 19/007; C01P 2004/64; C01P 2004/84; H01B 1/02; B82B 3/0095; C22B 11/04; Y10S 977/774
    See application file for complete search history.

(56) References Cited

U.S. PATENT DOCUMENTS

| 2005/0129580 | A1 | 6/2005 | Swinehart et al. |
| 2008/0112856 | A1 | 5/2008 | Stott et al. |
| 2011/0048171 | A1 | 3/2011 | Enright |
| 2014/0026714 | A1* | 1/2014 | Murphy ................ B22F 1/0025 75/370 |
| 2015/0182936 | A1* | 7/2015 | Kim ...................... B01J 19/126 423/509 |

OTHER PUBLICATIONS

He, L.B. et al., "Size controlled synthesis of semiconductor nanocrystals in a continuous-flow mode microcapillary reactor," *Eur. Phys. J. D*, 2009, pp. 15-18, vol. 52.

Kawa, M. et al., "Large-scale production of CdSe nanocrystal by a continuous flow reactor," *Journal of Nanoparticle Research*, 2003, pp. 81-85, vol. 5.

Nightingale, A.M. et al., "Microscale synthesis of quantum dots," *J. Mater. Chem.*, 2010, pp. 8454-8463, vol. 20.

Nightingale, A.M. et al., "A stable droplet reactor for high temperature nanocrystal synthesis," *Lab Chip*, 2011, pp. 1221-1227, vol. 11.

* cited by examiner

PROCESS FOR MAKING PRECISION NANOPARTICLES BY HYDROTHERMAL FLOW MANUFACTURING

CROSS-REFERENCE TO RELATED APPLICATIONS

This application is the U.S. national stage application of International Patent Application No. PCT/US2014/015106, filed Feb. 6, 2014, which claims the benefit of U.S. Provisional Application Ser. No. 61/761,315, filed Feb. 6, 2013, the disclosures of which are hereby incorporated by reference in their entireties, including any figures, tables, or drawings.

This invention was made with government support under 0749481 awarded by the National Science Foundation. The government has certain rights in the invention.

BACKGROUND OF INVENTION

Quantum dots (QDs) are semiconductor nanocrystals, generally salts of cations selected from the group consisting of heavy metals including lanthanides, actinides, and transition elements. Those employed for their optical properties typically include transition metals, such as Cd and Zn. Common anions included in the nanocrystalline salt are chalcogenides, Se, S, Te, and O. QDs can be of a core-shell form to modify the QD properties or for passivation of the core with an organic or inorganic coating. The shell typically uniformly surrounds the core. The shell, which is used to passivate the QD, is often a Cd or Zn salt of S or Se or an oxide layer designed to render the QD less toxic.

For optoelectronics applications it is desirable that the QDs have consistent particle size and shape. The particle size of the QD is the predominant determinant of absorption and emission properties for a given type of Quantum dot. However, the quality of the crystal structure, defects, dopants, and impurities can dramatically affect the bandgap and quantum yield. The shell composition and thickness can also affect these properties to various degrees by shifting the bandgap, lowering the quantum yield, or even quenching the emission entirely. The QD size depends on growth conditions, such as, the concentration of reactants, solvent system, temperature, use of surfactants, and reaction time. Traditional methods of semiconductor nanocrystal synthesis are batch processes. For example, the batch method for producing CdSe semiconductor nanocrystals uses a solvent mixture of trioctylphosphine (TOP), tri-n-butylphosphine (TBP), and trioctylphosphine oxide (TOPO) where batch size is limited to production of about several hundred milligrams of TOPO-capped CdSe nanoparticles. It is difficult to scale up batch synthesis due to variabilities in mixing, concentration gradients, and temperature uniformity. Batch synthesis generally produces QDs of relatively uniform size, although batch-to-batch reproducibility is often difficult and achieving the target size is not assured.

To overcome the limitations of the batch process, Barbera-Guille et al., U.S. Pat. No. 6,179,912, teaches a continuous flow process for producing semiconductor nanocrystals. Control of the process at ambient pressure involves selecting appropriate flow rates and temperatures to produce monodispersed QDs of a given size. The continuous flow process uses reservoirs of starting materials that deliver the reagents in series in a first section, then mixes the reagents, nucleates nanocrystals, allows nanocrystal growth, and terminates growth in successive sections of the reactor system. The QDs are often limited in applications by the quantum yield of their emission. In this manner, precise control over the particle size and size dispersity of the QDs is achieved. However, QDs prepared in this manner are capped with the organic ligands such as TOP, and this limits their ability to be used in aqueous systems.

Aqueous batch synthetic routes have been developed, but, typically suffer from long reaction times and the QDs that are produced often display a large number of surface defects that result in relatively poor photoluminescence quantum yields. To overcome these problems hydrothermal techniques have been developed where the synthesis is carried out at high temperatures and pressures in an autoclave. Yet, as with other batch processes, batch to batch reproducibility is often poor and the batch size is limited. Hence there remains a need to prepare consistent QDs and other nanoparticles of a desired size and dispersivity that are amenable to aqueous solutions and do so in a cost effective manner.

BRIEF SUMMARY

An embodiment of the invention is a continuous reaction system (CRS) for the production of nanoparticles of a desired size and with a narrow size distribution. The CRS is well suited for the hydrothermal synthesis of nanoparticles in aqueous solution, including QDs and core-shell QDs. The CRS includes a plurality of fluid reservoirs, each coupled with a dedicated pump, to provide a reagent solution of a desired concentration at a desired rate. The fluids are combined at junctions or static mixers downstream of the pumps, and are then directed into a heating chamber with a well-controlled temperature. A backpressure regulator allows the use of pressures above one atmosphere, thus the temperatures of the aqueous solutions can exceed 100° C. Downstream of the heating baths, an optional quenching bath can be implemented to rapidly drop the temperature and quench the crystal growth. Downstream of the crystal growth zone, one or more detectors are present that perform direct in-line measurement of optical properties (photoluminescence or absorption) or particle size. The detector(s) produces a proportional electronic signal that is provided to a signal processor that generates a proportional output signal as needed to the pumps, heater, and/or other components of the CRS. One or more of these are designated as the control variable(s) and used to vary the reactant concentration, temperature, residence time, or other parameter to achieve precise control of the nanoparticle size and achieve the desired properties, such as the optical properties of a QD.

An embodiment of the invention is a method of using the CRS to prepare QDs of metal chalcogenides in a continuous manner. The method can employ a single CRS or it may couple two CRSs inline to prepare core-shell QDs. Alternately, QDs can be employed as a reagent in a single CRS to prepare core-shell QDs. The tight control of temperature and residence time in the system permits the establishment of a desired size and then the consistent production of that size over any period of time. The size of the QD and the thickness of the shell can be controlled independently to achieve the desired QD product in one continuous process with high precision and quality in commercially viable quantities. In other embodiments of the invention, other semiconducting particle can be prepared using the CRS and the CRS can be employed to produce dielectric nanoparticles, such as silica particles, or metal nanoparticles, such as gold nanoparticles or any metal readily formed by reduction of a metal salt in aqueous solution.

DETAILED DISCLOSURE

Embodiments of the invention are directed to a method of preparing uniform nanoparticles, exemplified herein by the preparation of quantum dots (QDs), of a desired size in a continuous manner in aqueous solution and to a continuous reaction system (CRS) to perform the method. The continuous process occurs within a system that permits elevated temperatures and pressures, where the system includes means to measure the condition of the forming QDs and to provide feedback for adjusting processing variables that are appropriate to consistently achieve the desired size and composition of the QDs. The CRS allows the process to occur at high temperatures and pressures to avoid surface defects common in batch aqueous QD synthesis while allowing continuous preparation of high quality QDs. The CRS employs a flow method that is typically, but not necessarily, carried out under hydrothermal conditions, which by employing continuous parameter monitoring and variable adjusting, allow a very high level of precision. Alternatively, the controlled temperature and pressure system permits the use of non-aqueous solutions.

Parameters that are constantly detectable within the system include reactant concentration and stoichiometry, flow rates, temperatures, pressures, illumination, heterogeneous nucleation, and magnetic, electric, and/or gravitational fields imposed on the system. The primarily controlled variables that are adjusted or maintained after detection of the state of the system and the solutions within the system are concentrations, stoichiometry, flow rates, and temperature. The method allows controlled nanoparticle, for example, QD, throughput with commercially viable production quantities, where the nanoparticles are of a high quality and consistency. QDs may be prepared of a single composition, or may have a core-shell structure or be otherwise coated after preparation of preliminary QDs. The shell or coating permits preparation of QDs with modified band-gaps, improved quantum yield, or reduced toxicity. The coating process uses formed QDs that are fed into a similar CRS or, optionally, may be performed in a CRS that is effectively two CRSs combined in series to form the core-shell or coated QDs is a single process. The continuous method for preparation of QDs in an aqueous environment involves a residence time in the continuous reaction system of minutes, as opposed to the hours required in conventional batch methods. The system permits on-demand manufacturing, where precise QDs are produced as needed to minimize transportation costs, minimize waste, maintain the required inventory, and avoid problems related to QD stability, or other inventory issues, while ensuring the attainment of QDs of a size chosen to display the desired emission wavelength with a high precision.

The method, according to embodiments of the invention, allows mass production of quantum dots with precise peak of the emission wavelengths, which are within 0.5 nm of the desired wavelength. Products that can benefit from the precisely produced QDs include, but are not limited to: quantum dot lasers; visual displays; lighting systems; photovoltaics; optical devices; optical computers; multiplexed optical communication components; bio-imaging aids, and dyes.

In embodiments of the invention, the QD precursor solutions can be salts of the cations and anions in the final QDs or the precursors can be equivalents of the ions that are converted into the ions within the CRS. Additional co-reagents, such as reducing agents, can be supplied in the CRS to generate the desired ions. Other agents, such as surfactants or complexing agents, can be included to maintain a desired equilibrium concentration of free cations to achieve a nearly constant rate of QD growth.

In an embodiment of the invention, a CRS provides precursor solutions or fluid reagents from two or more reservoirs where fluid from each reservoir feeds a pump associated with that reservoir. The fluid is drawn from the reservoir, either directly or through a tube or other conduit, into the head of the pump. The pump can be a piston pump, peristaltic pump, diaphragm pump, centrifugal pump, magnetic drive pump, or any other type of pump that can accurately control the volume of fluid removed from the fluid reservoirs. Each pump is controlled to provide a specific flow rate or to vary the flow rate in a manner that maintains a desired sized QD at the discharge from the CRS. The precursor solutions are discharged from the pumps into conduits and are mixed at one or more junctions of the conduits, static or active mixers fed by the conduits, or any combination thereof, where a plurality of junctions and mixer are in a series configuration. For example, two or three reagent fluids can be mixed a single junction and subsequently that combined fluid can be mixed with a third or fourth reagent fluid at a junction or a mixer situated downstream of the junction. Various types of appropriately sized inline or shear mixers can be used. Combination of the two or more precursor solutions yields a combined fluid that includes all necessary reagents for the formation of the QDs. The temperatures of the junctions or mixers for combining can be thermostatically controlled or can be at ambient temperature. Ultimately, when all reagent fluids from the plurality of fluid reservoirs are mixed, a reaction fluid is formed. In general, although not necessarily, the temperature where the reaction fluid is formed is a temperature that is lower than the temperature of a heating chamber into which the combined fluid is introduced. Conduits providing the reagent fluids, combined fluids and the reaction fluid are of an appropriate material and sized to permit rapid heat transfer with the fluids within the conduits.

The temperature at which the heating chamber is maintained permits rapid growth of nucleated semiconductor crystals in the reaction fluid. The nucleated semiconducting material typically, but not necessarily, undergoes crystal nucleation prior to introduction into the heating chamber. The fluid volume within the reaction conduit in the heating chamber and the concentrations of the reagents are of a desired quantity for achieving the desired sized QDs. The heating chamber can be a heating bath, an oven, or any heating medium that permits a fine control of the temperature. The temperature is controlled, such that a temperature variance of about ±0.5° C. or less is achieved. In an embodiment of the invention, the heating chamber can be a heating bath including a cooler such that the heat transfer fluid of the bath can be heated and cooled as needed to maintain the desired temperature with minimal oscillation of the temperature. The heating chamber has a thermistor or other temperature probe that can provide a signal to a signal processor that permits control of the heating chamber to the desired temperature.

Upon exiting the portion of the reaction conduit in the heating chamber, the reaction fluid in the reaction conduit can, as required or desired, be passed through a quenching chamber, where the temperature is below a temperature where crystal growth is significantly retarded, generally to the extent that crystal growth is effectively halted. The reaction fluid, after QDs formation occurs in the reaction conduit, is analyzed using at least one detector that contacts the reaction fluid in the reaction conduit or is in-line with the reaction conduit downstream of the heating chamber, and, as desired, downstream of the optional quenching chamber. A pressure regulator is situated downstream of the heating chamber. In this manner, a desired pressure is maintained in the system.

The detector reads a QD size-dependent property, such as an emission wavelength, absorption wavelength, fluid viscosity, fluid density, or any variable property that reflects the size of the QDs and provides a signal that varies with that property. The signal, either transmitted as either an analog or digital signal, is provided to a signal processor that comprises a data acquisition and data processing device that can generate a variable output signal to any or all of the pumps, heaters, and coolers within the CRS. The data acquisition and processing device can be a microprocessor or other computer that employs appropriate software programs.

After exiting the detector region of the CRS, the QDs are passed through an outlet where the QDs can be collected and undergo post processing, such as washing and packaging. In an embodiment of the invention, the outlet of one CRS can function as a reagent fluid reservoir to a coupled second CRS. In this manner, a suspension of QDs and, optionally, an excess reagent precursor to the QDs in suspension is combined with other reagent fluids provided from other fluid reservoirs of the second CRS. In this manner, the QDs in suspension nucleate the growth of a second semiconducting material on its surface to form core-shell QDs.

The method employing the CRS is amenable to the production of a variety of QDs. In addition to the $Cd_2Te_3$ QDs, that are taught in examples below and the $Cd_2Te_3$—CdS core-shell QDs, the system is amenable to any QDs that can be prepared employing pressures at or above 1 atmosphere in both aqueous and organic solvent systems.

In an embodiment of the invention, other semiconducting chalcogenides can be prepared from other metals, for example any transition metal chalcogenide. In an embodiment of the invention, the method using the CRS can be carried out to prepare silica nanoparticles, other dielectric nanoparticles, or semiconducting nanoparticles, for example titania, alumina, germanium oxide, zinc oxide, or other metal oxide nanoparticles with a controlled size and narrow size distribution. In another embodiment of the invention, a metal nanoparticle can be prepared where an aqueous solution of a metal salt is mixed with a reducing agent to form a metal nanoparticle, for example, a gold nanoparticle, of controlled size. In an embodiment of the invention, core shell nanoparticles can be prepared, where the core and shell can be different in type, for example, a silica nanoparticle core can be coated with a gold shell. The core can be a metal, a metal oxide, a metal chalcogenide, or even an organic polymer and the shell can be a metal, a metal oxide, or a metal chalcogenide.

Figure 12:
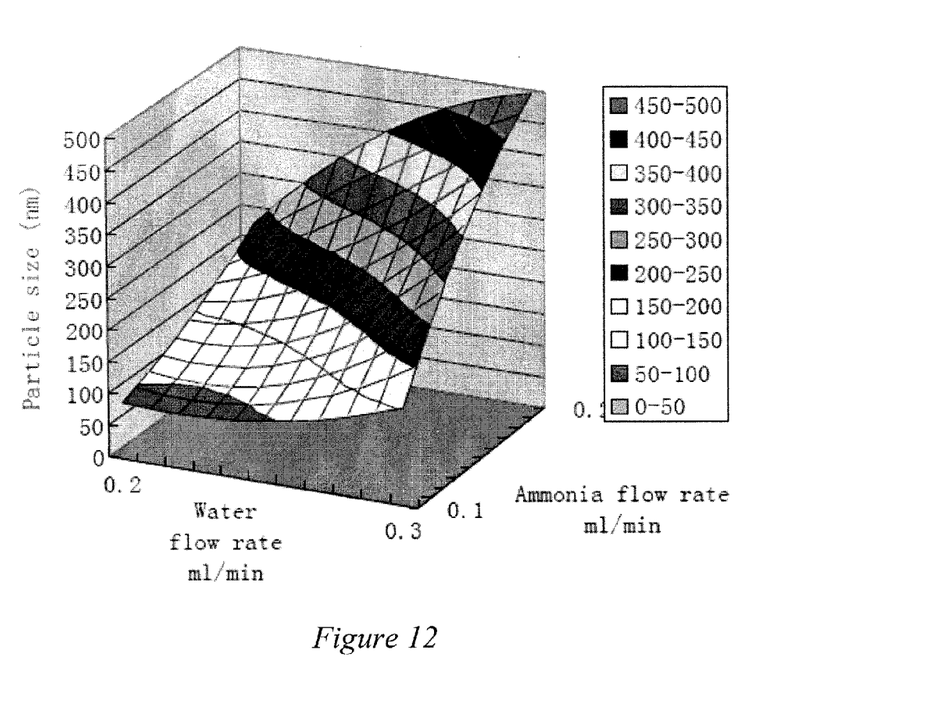
FIG. 12 shows a 3-D plot of the silica particle size based on the flow rates of water and ammonia, according to an embodiment of the invention.

In an exemplary embodiment, silica nanoparticles are prepared by a Stober synthesis, where the tetraalkoxysilane, for example tetraethoxysilane TEOS and ammonia are combined in an aqueous alcohol solution, for example an ethanol solution, using the CRS. As indicated in FIG. 12, by controlling the flow rates, various sized silica particles can be prepared where the distribution of silica nanoparticle sizes was ±2%. In an embodiment of the invention, gold nanoparticle can be prepared with a size distribution of only ±1% by the reduction of chloroauric acid by a reducing agent, such as sodium citrate.

Methods and Materials

Instruments

Figure 1:
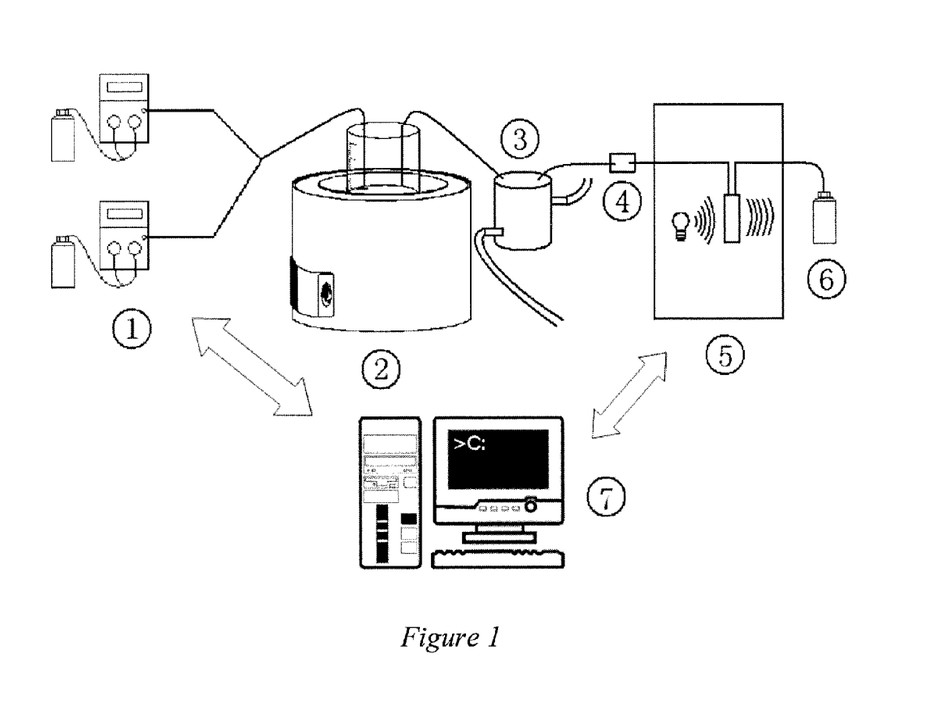
FIG. 1 shows an exemplary continuous flow system (CRS) for QD synthesis with: 1) piston pumps to deliver aqueous precursor solution at a desired rate into tubing; 2) an oil/heating bath for heating the mixed precursors and maintaining the temperature for a desired period; 3) a cooling bath to quench the reaction; 4) a back pressure regulator to maintain a constant pressure; 5) a florescence spectrophotometer to assess the size of the QDs by their emission spectrum; 6) a sample collector; and 7) a processor for data acquisition and feedback control of the pumping and heating, according to an embodiment of the invention.

A flow synthetic system (FSS), as shown in FIG. 1, was constructed with two piston pumps (Syrris Co.), a PTFE tube (0.75 mm ID), stainless-steel (SS) tubes (1/16" & 1/32" ID), and a backpressure regulator (IDEX Co.). A Hitachi F-2000 fluorescence spectrophotometer with a 10 mm path length flow quartz cuvette 440 μL (NSG Precision Cells) was employed as an inline detector to monitor the emission spectra. All optical measurements were carried out at room temperature under ambient conditions. All pH measurements were made using an AR60 pH meter (Fisher Scientific). Transmission electron microscopy (TEM, JEOL 2010F) was used to characterize the CdTe QDs. Labview 8.5 software was used to coordinate online measurement from the fluorescence spectrophotometer for the purpose of controlling the flow rate imposed by the pumps. Quantum yields were measured by a fluorometer (Horiba NanoLog).

Precursor Solutions

A 125 mg portion of $TeCl_4$ was dissolved in 500 mL DI water and the pH adjusted by a dropwise addition of 1 M NaOH solution to form a clear $TeCl_4$ solution. The $TeCl_4$ solution was deoxygenated by bubbled nitrogen through the solution and a nitrogen overgas was maintained throughout the process. After 30 minutes, a 250 mg portion of $NaBH_4$ was dissolved in water to yield a pH 9.3 solution that was injected into the $TeCl_4$ solution. The solution was warmed using a hot plate to 80° C. with stirring until clear where reduction resulted in a Te precursor solution and the solution was cooled to room temperature. In a second flask, 2.292 g of $CdCl_2$ was dissolved in DI water with 2.292 g of NAC and the pH was adjusted to 9. At a 1:1 or greater molar ratio of N-Acetylcysteine (NAC) to $CdCl_2$, a clear $Cd^{2+}$ precursor solution resulted, and the solution was deoxygenated by bubbling nitrogen through the solution.

CRS Design and Set-Up

The CRS shown in FIG. 1, controlled the process for preparing quantum dots by setting the flow of two piston pumps to feed precursor solutions into capillary PTFE tubing (ID=500 μm) and/or SS tubing at a controlled flow rate. The nucleation and reaction growth take place in the heat zone of the tubes, which held a volume of: 360 μL for PTFE tubing; 250 μL for 1/32" SS tube; and 2.4 ml for 1/16" SS tube, where the tubing is coiled and set in an oil bath at a finely controlled constant temperature. The warm solution was cooled by passing the solution though coiled PTFE tubing, with a volume of 360 μL, in a water bath to quench the reaction, where pressure was controlled by a back pressure regulator (9-13 bar). A flow quartz cuvette in the fluorescence spectrophotometer was connected inline.

Figure 2:
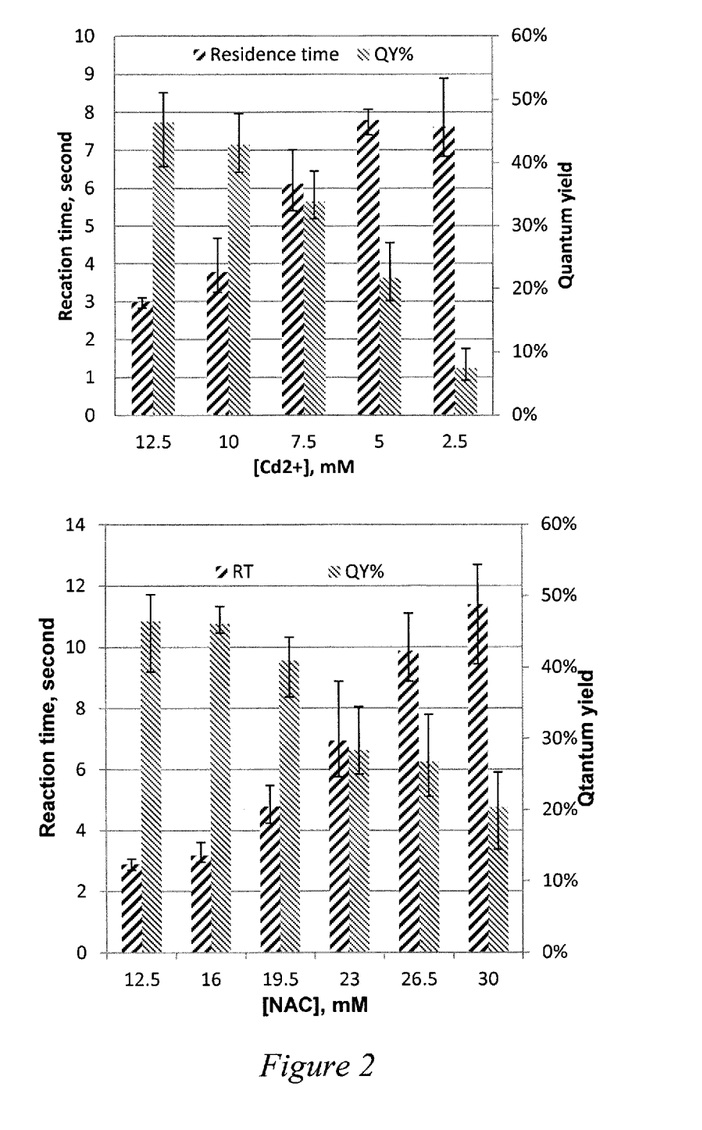
FIG. 2 shows bar graphs of a) $[Cd^{2+}]$ and b) N-acetylcysteine [NAC] concentration dependence at constant [NAC]=15 mM or $[Cd^{2+}]$=12.5 mM, respectively, with a constant Te precursor concentration of 0.5 mM and a reaction temperature of 170° C. on the reaction time required to achieve QDs of $\lambda_{max}$=577 nm, left column and axis, and quantum yield QY, right column and axis, for continuously produced CdTe QDs, according to an embodiment of the invention.

The reaction conditions were adjusted to minimize emission wavelength fluctuation, primarily due to temperature fluctuation. Different residence times and precursor ratios were examined by changing the flow rate of the precursor solutions. By carefully tuning these parameters, the FSS produced high quantum yield QDs with the $\lambda_{max}$ ranging from 500 to 800 nm. The initial ratio of QD components in the precursor solutions [Cd]:[ligand]:[Te] was set to 1:2.4:0.5. The effect of precursor solution concentrations and residence time on QD's PL properties was explored for QDs that emit at 557 nm using different reagent concentrations. Results indicated that the amounts of $[Cd^{2+}]$ as well as [NAC] strongly influence the PL properties of hydrothermally prepared CdTe QDs. As shown in FIG. 2, the quantum yield (QY) for CdTe QDs gradually increased from 20% and stabilized at 45% as $[Cd^{2+}]$ increased from 2.5 mM to 12.5 mM at 170° C. with [NAC]=15 mM and $[Te^{2-}]$=0.50 mM. Increasing [NAC] has an opposing effect on the QY, where QY was reduced from 46% to 20% as the [NAC] increased from 12.5 mM to 30 mM where $[Cd^{2+}]$=12.5 mM. The required residence times to achieve 577 nm QDs for various concentrations reduced as the optimal precursor solution concentrations approached their optimal concentration, where the residence time reduced from 7.6 seconds with 2.5 mM $[Cd^{2+}]$ to 3 seconds for 12.5 mM $[Cd^{2+}]$ and 11 seconds for 30 mM [NAC] to 3 seconds with about 12.5 mM [NAC]. Variations of QY are believed to be dependent on the quantity of surface defects of QDs. An equilibrium between dissolution and crystal growth at the QD surface permits repair of defects by the Ostwald ripening.

Alternatively, surface defects can be reduced by depositing a thin tellurium-poor layer over the original defects by forming a layer of organic ligands. The ligand molecule's sulfur atoms interact with the QDs' surface and supply sulfur atoms to the crystal structure. As the ratio of $[Cd^{2+}]$:$[Te^{2-}]$ increases, the QD surface appears to be enriched in cadmium atoms, providing more sites for ligand attachment. When the QD surface becomes full of cadmium atoms, further increasing of the $[Cd^{2+}]$:$[Te^{2-}]$ ratio cannot drive ligand attachment, and the improvement of QY diminished as the ratio increased from 10 mM to 12.5 mM.

Nucleation and crystal growth rates are dependent on the concentration of the free precursor, such as any free cadmium ions. Greater free cadmium ions concentrations lead to a faster reaction. Cadmium ions coordinate with NAC at near-neutral pH and at high pH, permitting preparation of cadmium precursor solutions under alkaline conditions. [Al] Free cadmium ions are available at a very low concentration of NAC. By increasing $[Cd^{2+}]$ or decreasing [NAC], more free cadmium ions are in solution which promotes nucleation and accelerates crystal growth.

Figure 3:
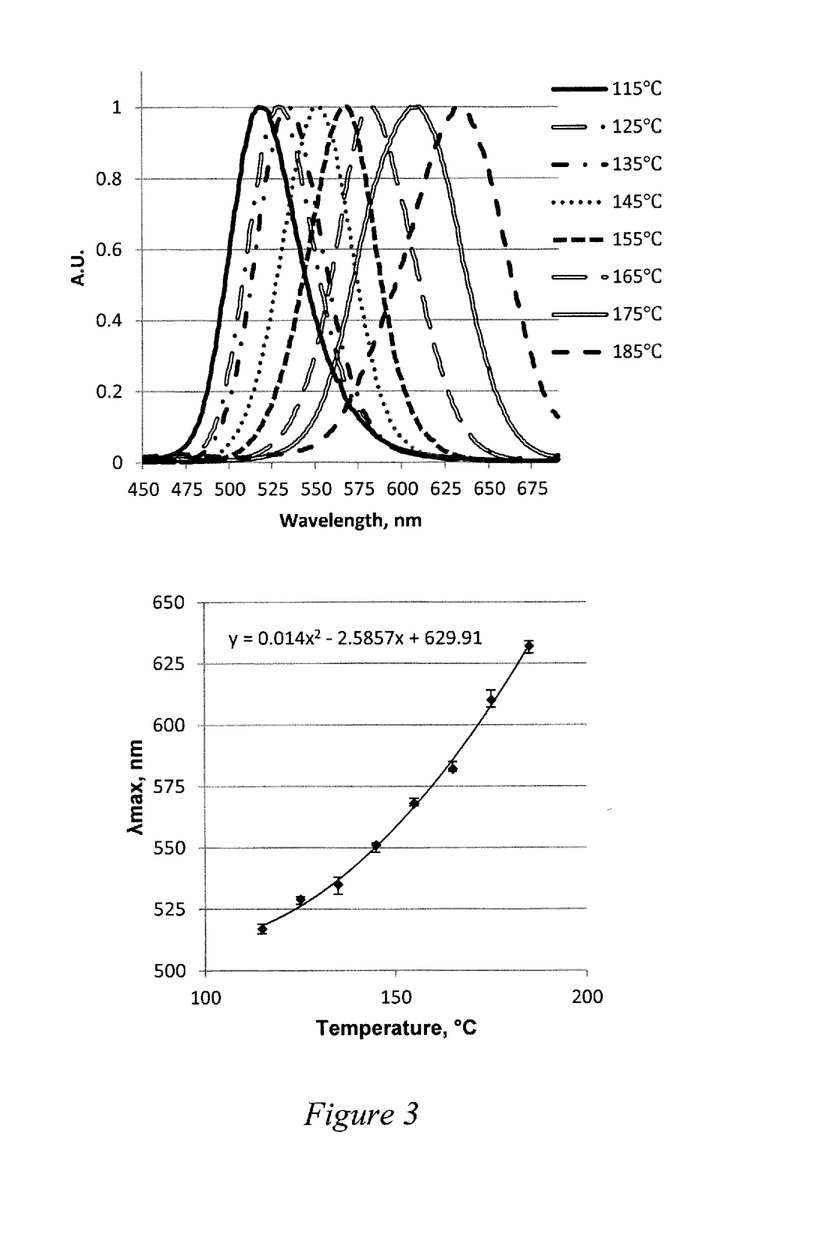
FIG. 3 shows a) normalized emission spectra for QDs synthesized, according to an embodiment of the invention, at different temperatures, at a constant residence time of 5.8 seconds, where the emission wavelength for excitation at 350 nm of QDs grown at temperatures ranging from 115 to 185° C. and b) a plot of $\lambda_{max}$ of the QDs emission vs. their growth temperature.

Heated bath temperatures were varied from 115 to 185° C. at a residence time of 5.8 seconds. FIG. 3a shows normalized emission wavelength spectrum where the emission wavelength and, therefore, the size of QDs increases with increasing temperature. The $\lambda_{max}$, in nm, dependence on temperature T, in ° C., is plotted in FIG. 3b, which is consistent with the equation:

$$\lambda_{max}=0.0309T^2-6.6238T+866.64.$$

Using this equation with these reagent concentrations, one can estimate the temperature required to consistently prepare QDs of a desired $\lambda_{max}$ as the CRS permits the control of temperature to one degree, which permits control of $\lambda_{max}$ to about 0.5 nm. The QDs synthesized at 115° C. displayed the smallest $\lambda_{max}$ for CdTe QDs formed by any hydrothermal method. The maximum temperature of these experiments was limited by the back pressure regulator employed which did not allow pressures in excess of 10 bar. The QDs prepared with the exemplary CRS at 170 to 180° C. allowed the highest production rates as well as the highest PL properties, with 40-60% quantum yields achieved for QDs with a $\lambda_{max}$ of 510 to 730 nm.

Figure 4:
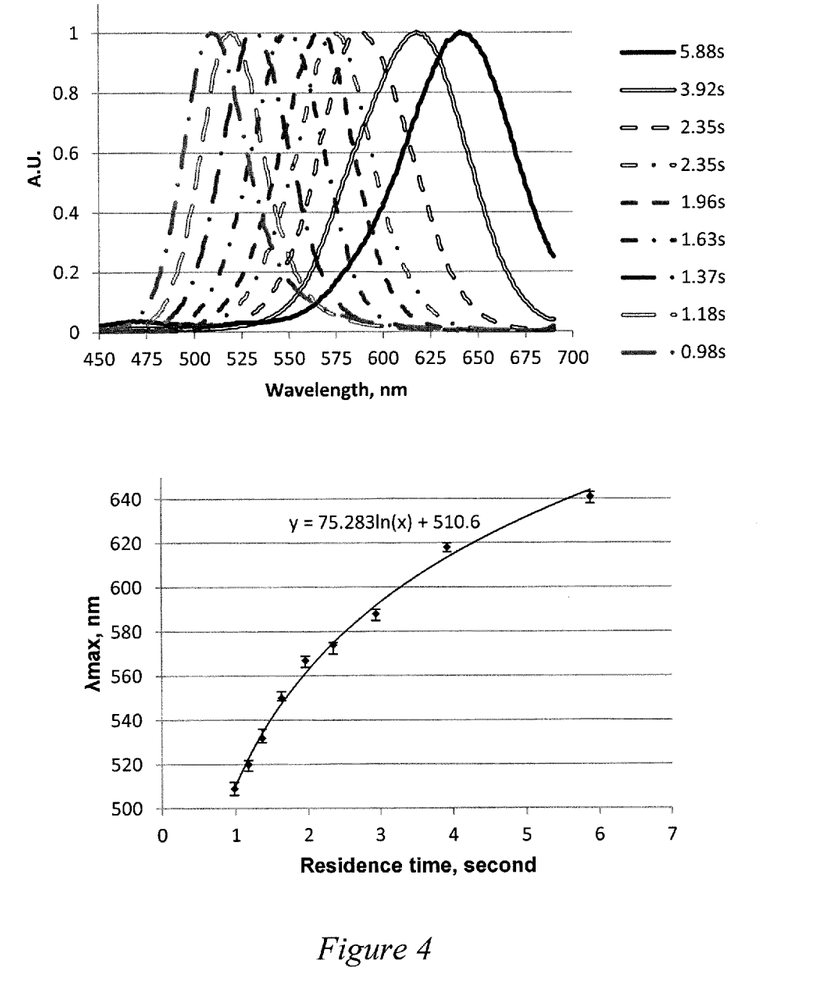
FIG. 4 shows a) normalized emission spectra for QDs synthesized, according to an embodiment of the invention, where the residence time is varied from 0.98 to 5.88 sec. at a constant growth temperature of 170° C. showing the variation of emission wavelengths for excitation at 350 nm, and b) a plot $\lambda_{max}$ of the QDs emission vs. their residence time.

The effect of the residence time on QD size, as indicated by $\lambda_{max}$, is plotted in FIG. 4a for a reaction temperature of 180° C. Under these conditions longer residence times produced QDs with longer wavelength emissions. CdTe QDs with $\lambda_{max}$ of 509 nm to 641 nm were formed, indicating that the diameters of the QDs were 2.5 to 4.0 nm. The flow rate of the pumps could be adjusted by as little as 0.02 ml/min, which permits control of the QDs' $\lambda_{max}$ to 0.5 nm using the exemplary apparatus, which is the best resolution known to be achieved for any method of forming QDs. The residence times required for QD growth with this apparatus are orders of magnitude faster than conventional batch synthesis. FIG. 4b indicates that the relationship of residence time, t, in seconds, to emission wavelength, $\lambda_{max}$, in nm, is logarithmic as defined by the equation:

$$\lambda_{max}=78.283 \ln(t)+510.6.$$

Figure 5:
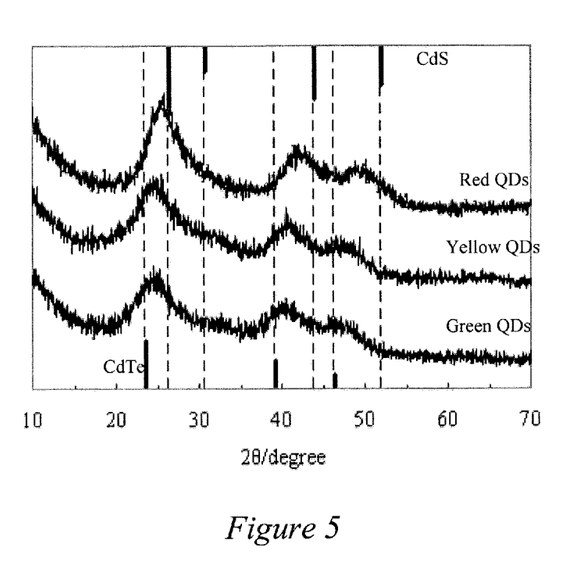
FIG. 5 shows XRD patterns for CdTe QDs prepared, according to an embodiment of the invention, at constant temperature with different residence times.

XRD patterns of CdTe QDs produced at different residence times are shown in FIG. 5. The XRD pattern for the green QDs is consistent with that of bulk CdTe, which belongs to cubic (zinc blende) structure. The XRD patterns for yellow and red QDs indicates that the crystal structure of QDs shifts from cubic CdTe towards a cubic CdS as the residence time increases. This change is consistent with the generation of a sulfur shell by partially hydrolyzing the NAC ligands. By using DMF as the solvent or by performing the hydrothermal synthesis at lower pH (5.6-5.9) in the presence of 2-mercaptoethylamine as a stabilizer, incorporation of sulfur into the growing CdTe QDs is inhibited.

Figure 6:
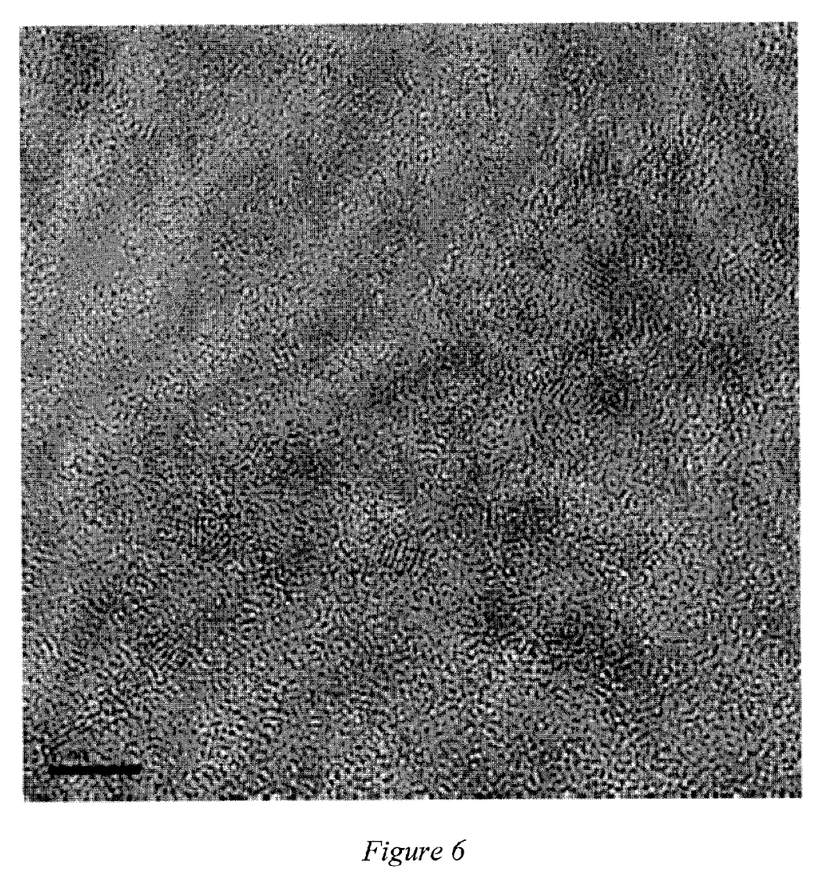
FIG. 6 shows a TEM image of CdTe QDs produced at 180° C. with a residence time of 3.5 seconds, according to an embodiment of the invention.

CdTe QDs synthesized at 180° C. were characterized by transmission electron microscopy (TEM) as shown in FIG. 6. Distinguishable lattice planes in the image, upon amplification, reveal a high crystallinity of the QDs and the image indicates a narrow particle size distribution where the average size is about 2 nm.

Figure 7:
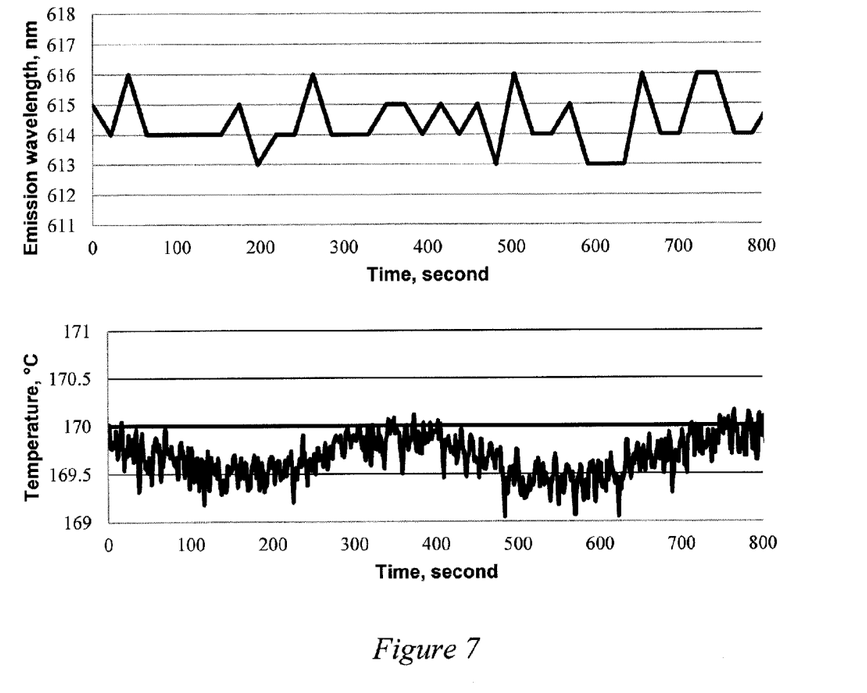
FIG. 7 shows plots of a) the QDs' emission wavelength fluctuation with b) the temperature fluctuation during their continuous preparation, according to an embodiment of the invention.
Figure 8:
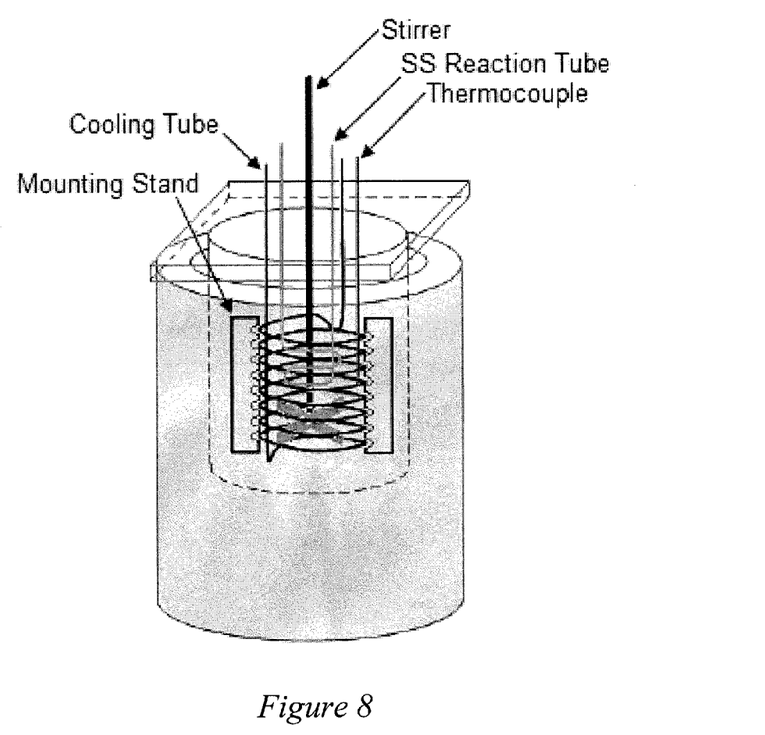
FIG. 8 is a drawing of an exemplary heating system employed in the CRS for the preparation of QDs, according to an embodiment of the invention.
Figure 9:
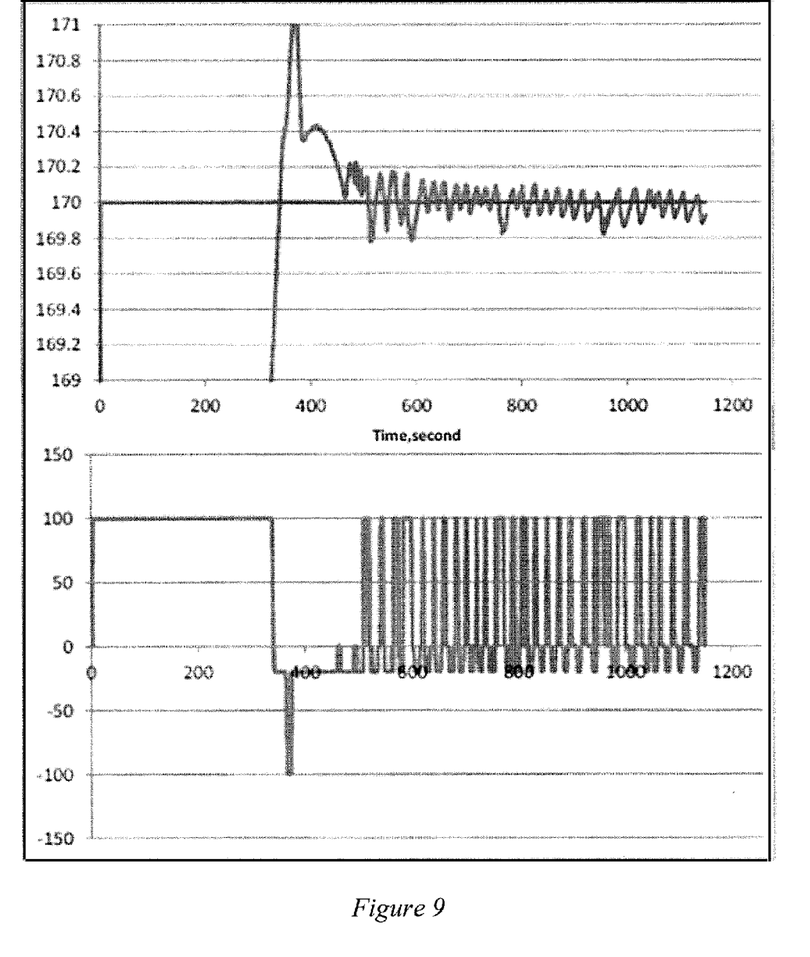
FIG. 9 shows a) a plot of the temperature upon increasing the heat from 160 to 170° C. in the exemplary heating system of FIG. 8 where b) the heating and cooling is switched using an on-off controller, in an exemplary CRS, according to an embodiment of the invention.
Figure 10:
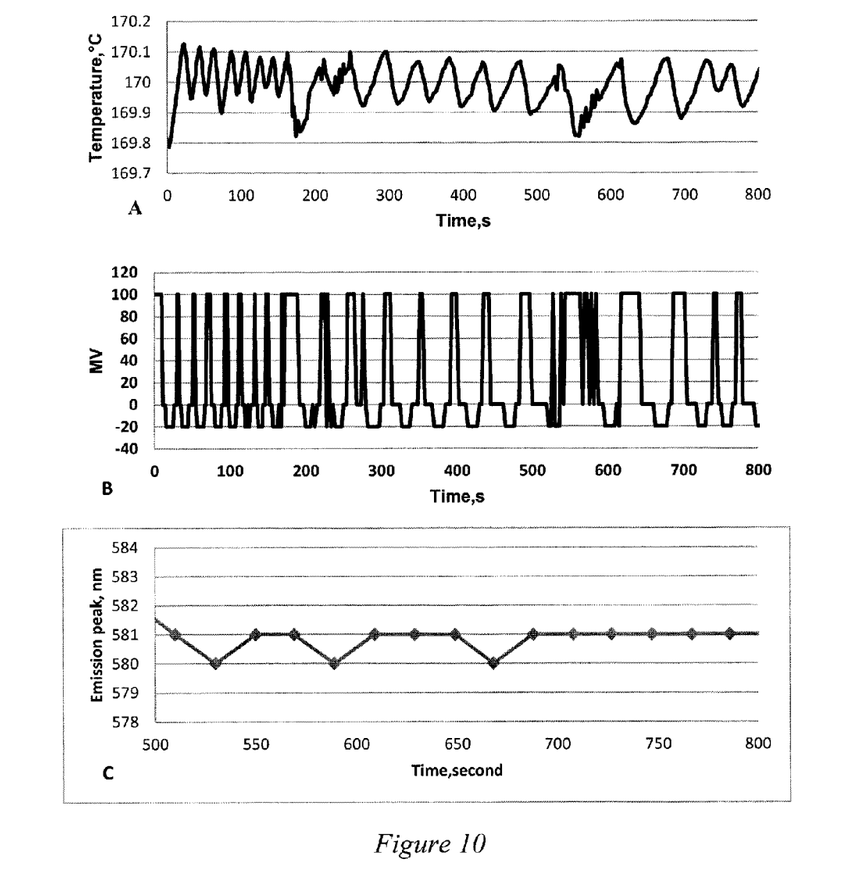
FIG. 10 shows a) a plot of the controlled temperature upon achievement of a stable target reaction temperature for the heating system with b) power switching by an on-off controller to achieve the stable temperature and c) the $\lambda_{max}$ variation of the QDs produced in an exemplary CRS, according to an embodiment of the invention.

FIG. 7 illustrates the sensitivity of the size of the QDs, as indicated by a) $\lambda_{max}$, to b) the reaction temperature. To achieve a stable controlled temperature a heating system, as illustrated in FIG. 8, was constructed with an externally stirred heating mantel coupled with copper coils through which cooling water is driven by a peristaltic pump. The heating mantel's maximum heating rate was determined to be 4.5° C./min at its full power. The cooling water flow was set and controlled by Labview software to cool at a rate of −4.5° C./min. A thermal couple was placed adjacent to the central SS reaction tube to precisely detect the heating bath temperature. FIG. 9a) shows the response of the heating system where the set point was increased from 160 to 170° C. with the heating mantel set to full power, 100 in plot of FIG. 9b). The temperature reached 169.5° C. where the temperature overshot the set temperature by 1° C. but stabilized in about 60 seconds. The temperature oscillated with the sequential on-off states of the heating and cooling means and thereafter was maintained in a range of ±0.2° C. The precision of the QD size formed when the temperature stabilized was quite high, as shown in FIG. 10, displaying a $\lambda_{max}$ fluctuation of ±2 nm, with a standard deviation of the emission wavelength of only 0.69 nm and a mean of 581 nm by controlling the temperature to ±0.2° C.

Core-Shell QD

The coating of CdTe QDs for the production of CdTe/CdS QDs relies on the controlled reaction of $S^{2-}$ with $Cd^{2+}$. The $S^{2-}$ ion can be provided by the NAC ligand or by a sulfide salt, such as $Na_2S$. The ligand provides the $S^{2-}$ by self-degradation and surface reaction with the CdTe QD; however, there is a limit to the red shift that is possible due to competing ligation and the instability of the ligand is insufficient to supply adequate amounts of $S^{2-}$ to form a shell on the QDs. In contrast, a sulfide salt, such as $Na_2S$, rapidly forms CdS, to the extent that nucleation and growth of CdS crystals exceeds the rate of CdS shell formation, where the necessary limited [$S^{2-}$] introduction is difficult.

To overcome this difficulty, the $S^{2-}$ ions were provided by the degradation of sodium thiosulfate in an acidic environment. Sodium thiosulfate decomposition at pH<7 occurs as follows:

$$S_2O_3^{2-} + 2H^+ \leftrightharpoons H_2O + S\downarrow + SO_2.$$

When mixed with the $Cd^{2+}$, three thiosulfate compounds: $CdS_2O_3$; coordination complex $[Cd(S_2O_3)_2]^{2-}$; and coordination complex $[Cd(S_2O_3)_3]^{4-}$, are formed with their proportions depending on the concentration of $S_2O_3^{2-}$. All three compounds degrade slowly under UV or acidic environments at room temperature. The overall reaction is:

$$[Cd(S_2O_3)_x]^{2(x-1)-} + H_2O \rightarrow CdS + SO_4^{2-} + (x-1)S_2O_3^{2-} + 2H^+.$$

Figure 11:
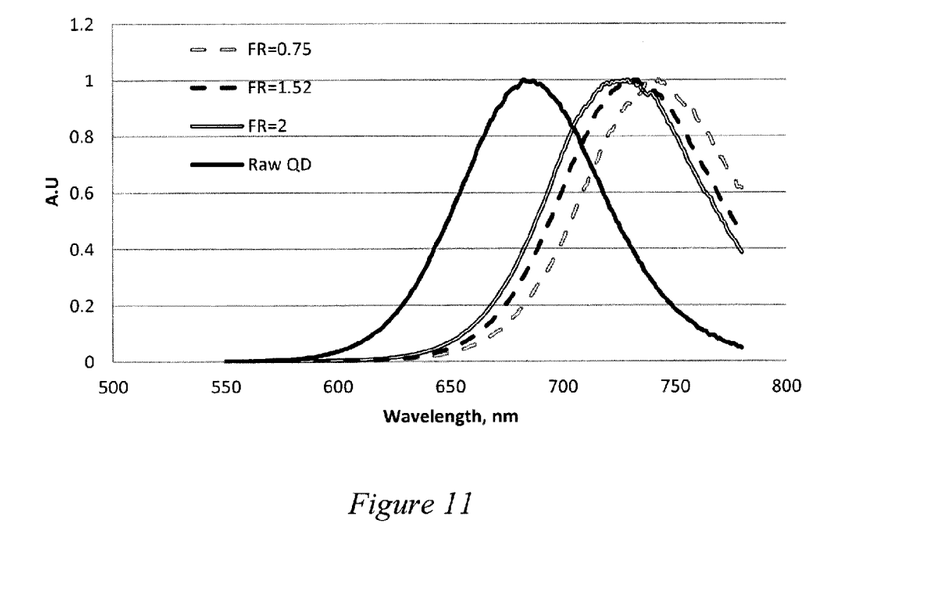
FIG. 11 shows the red shift of the emission wavelength for core/shell CdTe/CdS QDs excited at 350 nm where CdTe QDs were introduced in the CRS for deposition of the CdS shell at 120° C. with flow rates of 0.75, 1.52 and 2 mL/minute, according to an embodiment of the invention.

A CdTe QD solution was prepared and placed in reservoir in the CRS. The QD solution contained unreacted $Cd^{2+}$ of approximately 12 mM from the QD synthesis. The QDs had a $\lambda_{max}$ of 624 nm. A second reservoir was loaded with diluted HCl solution and a third reservoir was loaded with sodium thiosulfate solution. The solutions were supplied to maintain a 5:1 molar ratio of thiosulfate to $Cd^{2+}$ such that all $Cd^{2+}$ was bound as a coordination complex. As can be seen from Table 1, below, the red shift of $\lambda_{max}$ for the core shell QDs depended on the reaction time, temperature, and molar ratio employed. The formation was also dependent upon the pH. The red shift of the $\lambda_{max}$ increased as the residence time increased, with a maximum shift of about 100 nm before precipitation, as indicated in FIG. 11. The reaction temperature and the pH are two critical parameters for shell formation. An increase in temperature from 90 to 170° C. reduced the reaction time from minutes to seconds. Although high temperatures dramatically accelerate the reaction, it is difficult to achieve the maximum red-shift because the difference in residence time between shell formation and agglomeration and precipitation of the particles is very small. Lower temperature provides a sufficiently large time difference for the two events and coating can be carried out without precipitation that results in tube blockage. An increase of the quantity of acid, hence a lower pH, also accelerates the reaction. Following online fluorescence detection, the product QDs were collected in NaOH solution to quench the reaction. Subsequently, the QDs solution was centrifuged and washed with DI water to remove the unreacted sodium thiosulfate. Precise emission spectrums were measured offline by a Horiba Nanolog UV/NIR spectrophotometer, which gives better accuracy at wavelengths above 650 nm.

TABLE 1

Shell formation for various flow synthesis conditions.

| Residence Time in sec. | Flow Rates $Cd^{2+}:S_2O_3^{2-}:H^+$ | $Cd^{2+}:S_2O_3^{2-}$ | Temperature in ° C. | $\lambda_{max}$ in nm |
|---|---|---|---|---|
| 72 | 2:1:1 | 1:5 | 120 | 682 |
| 96 | 2:1:1 | 1:5 | 120 | 693 |
| 144 | 2:1:1 | 1:5 | 120 | 697 |
| 144 | 2:1:1 | 1:5 | 130 | precipitation |
| 7.5 | 2:1:1 | 1:5 | 150 | 670 |
| 7.5 | 2:1:1 | 1:5 | 160 | 681 |
| 9.375 | 2:1:1 | 1:5 | 160 | 696 |
| 10 | 2:1:1 | 1:5 | 160 | 688 |
| 15 | 2:1:1 | 1:5 | 160 | 698 |
| 30 | 2:1:1 | 1:5 | 160 | precipitation |
| 15 | 2:1:1 | 1:5 | 170 | 715 |
| 73 | 4:1:1 | 1:2.5 | 130 | 663 |
| 72 | 4:1:3 | 1:2.5 | 130 | 722 |
| 96 | 4:1:3 | 1:2.5 | 130 | precipitation |

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A continuous reaction system (CRS) for preparation of nanoparticles, comprising:
   a plurality of reagent fluid reservoirs;
   a plurality of pumps, wherein each of said pumps is connected to a fluid velocity control means and directs fluid flow through a first conduit from a single reservoir of said plurality of reservoirs;
   at least one first junction or first mixing means, wherein at least two of said conduits connect for mixing of said reagent fluids to form a first combined fluid and directing said first combined fluid to at least one second conduit, and, optionally, at least one second junction or second mixing means, wherein at least two of said first conduits and/or second conduits connect for mixing of said reagent fluids and/or said combined fluid to form plurally combined fluid, wherein said combined fluid or said plurally combined fluid is a reaction fluid in at least one reaction conduit exiting the last of said first junction, said first mixing means, said second junction or said second mixing means;
   a heating chamber comprising a heater, optionally, a cooler, a heat transfer medium, a temperature probe, and, optionally, a temperature controller, wherein a portion of said reaction conduit is housed within said heating chamber and said reaction fluid is brought to and maintained at a set reaction temperature that promotes particle growth;
   optionally, a backpressure regulator;
   optionally, a thermal quenching chamber, downstream of said heating chamber, wherein a portion of said reaction conduit is housed, wherein the temperature of said reaction fluid is below a maximum temperature where said particle growth and particle nucleation is inhibited;
   at least one detector, connected to the reaction conduit downstream of the heating chamber, wherein said detector generates a variable signal while monitoring a property dependent upon the size of semiconducting nanoparticles and outputs said variable signal;
   a pressure regulator and, optionally, a pressure sensor;
   a signal processor for:
      receiving said variable signal from said detector, and, optionally, a variable signal from said temperature probe, and, optionally, a variable signal from said pressure sensor;
      comparing said variable signals to anticipated signals consistent for said nanoparticles of a desired size; and
      providing a signal to at least one of said plurality of pumps, said heater, said cooler, and said optional temperature controller; and
   an outlet for said reaction fluid comprising said nanoparticles.

2. The CRS according to claim 1, further comprising a second CRS according to claim 1, wherein said outlet of said first CRS comprises one of said reaction fluid reservoirs of said second CRS, wherein said semiconducting nanoparticles from said second CRS comprise core-shell nanoparticles.

3. The CRS according to claim 1, wherein said detector comprises an inline sample chamber.

4. The CRS according to claim 1, wherein said detector comprises a provider of electromagnetic radiation and a receiver of electromagnetic radiation that is sensitive to the received wavelength.

5. A method of producing nanoparticles using at least one CRS according to claim 1 or 2, comprising:
   placing a plurality of said reagent fluids into said reagent fluid reservoirs wherein each of said reagent fluids consists of an aqueous solution or an aqueous suspension;
   maintaining a pressure in said reaction conduit in excess of one atmosphere;
   establishing and maintaining said fluid flow, said temperature of said heating chamber; and, optionally, said temperature of said thermal quenching chamber to achieve and maintain said anticipated signal from said detector by said signal processor upon receiving said variable signals, comparing said variable signals and providing said signals to one or more of said pumps, said heater, said cooler, or said temperature controller; and
   collecting nanoparticles or core-shell semiconducting from said outlet, wherein said nanoparticles provide said property dependent upon the size of nanoparticles of said anticipated value and the variance from said anticipated value is less than one percent of said anticipated value over any period of time for said collecting after a period of time required for said establishing.

6. The method according to claim 5, wherein said reagent fluids comprise a first reagent fluid comprising a metal halide and, optionally, a complexing ligand, and a second reagent fluid comprising a chalcogenide halide and a reducing agent, wherein said nanoparticles are quantum dots.

7. The method according to claim 6, wherein said metal halide is $CdCl_2$ and said complexing ligand is N-Acetylcysteine.

8. The method according to claim 5, wherein said metal halide is $CdCl_2$, said complexing ligand is N-Acetylcysteine, said chalcogenide halide is $TeCl_4$, said reducing agent is $NaBH_4$ and said quantum dot comprises CdTe.

9. The method according to claim 6, wherein said reagent fluids for a second CRS comprise a third reagent fluid comprising a nanoparticle from a first CRS having an excess of said metal halide of said first reagent solution and a fourth reagent fluid comprising a salt of a second chalcogenide.

10. The method according to claim 9, wherein said third reagent fluid comprising CdTe nanoparticle from a first CRS and said fourth reagent fluid comprising $Na_2S$ or $Na_2S_2O_3$.

11. The method according to claim 5, wherein said reagent fluids comprise a first reagent fluid comprises a metal alkoxide, and a second reagent fluid comprises ammonia or alkali metal hydroxide, wherein said nanoparticles are metal oxide nanoparticles.

12. The method according to claim 11, wherein metal alkoxide comprises traethoxysilicon (TEOS), and a second reagent fluid comprises ammonia, wherein said nanoparticles are silica nanoparticles.

13. The method according to claim 5, wherein said reagent fluids comprise a first reagent fluid comprising a metal salt and a second reagent fluid comprises a reducing agent, wherein said nanoparticles are metal nanoparticles.

14. The method according to claim 13, wherein said metal salt comprises chloroauric acid and said reducing agent comprises sodium citrate, wherein said nanoparticles are gold nanoparticles.

* * * * *